US008472317B2

(12) United States Patent
You et al.

(10) Patent No.: US 8,472,317 B2
(45) Date of Patent: Jun. 25, 2013

(54) METHOD FOR RESOURCE AND ADMISSION CONTROL

(75) Inventors: Jianjie You, Guangdong (CN); Mo Sun, Guangdong (CN); Jun Song, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 236 days.

(21) Appl. No.: 12/999,345

(22) PCT Filed: Oct. 20, 2009

(86) PCT No.: PCT/CN2009/074521
§ 371 (c)(1),
(2), (4) Date: Dec. 16, 2010

(87) PCT Pub. No.: WO2010/148600
PCT Pub. Date: Dec. 29, 2010

(65) Prior Publication Data
US 2011/0235507 A1    Sep. 29, 2011

(30) Foreign Application Priority Data
Jun. 24, 2009  (CN) .......................... 2009 1 0146747

(51) Int. Cl.
*H04L 1/00*        (2006.01)
*H04L 12/26*       (2006.01)
(52) U.S. Cl.
USPC ........................................................ 370/230
(58) Field of Classification Search
None
See application file for complete search history.

(56) References Cited

U.S. PATENT DOCUMENTS

| 8,249,236 B2* | 8/2012 | Das et al. ................. 379/202.01 |
| 2007/0201513 A1* | 8/2007 | Anderson et al. ............. 370/468 |
| 2010/0271943 A1* | 10/2010 | Wu et al. ....................... 370/230 |
| 2011/0145416 A1* | 6/2011 | You ............................... 709/226 |

FOREIGN PATENT DOCUMENTS

| CN | 101001402 A | 7/2007 |
| CN | 101222432 A | 7/2008 |

OTHER PUBLICATIONS

Yavatkar et. al., "A Framework for Policy-based Admission Control", RFC 2753, Jan. 2000.*

* cited by examiner

*Primary Examiner* — Ayaz Sheikh
*Assistant Examiner* — Blanche Wong
(74) *Attorney, Agent, or Firm* — Li&Cai Intellectual Property (USA) Office

(57) ABSTRACT

The present invention provides a method for resource and admission control. In the process of resource requesting: upon receiving a resource initialization request, which is used for requesting a QoS resource for a service, sent by an SCF, a PD-FE of a visited network performing an authorization check and a resource availability check for the resource initialization request, and sending the resource initialization request to a PD-FE of a home network; the PD-FE of the home network performing an authorization check and making an initial policy decision for the resource initialization request, and sending a resource initialization response containing the generated initial policy decision to the PD-FE of the visited network; and the PD-FE of the visited network making a final admission decision for the resource initialization request according to the initial decision policy and the result of the resource availability check. The method provided by the present invention specifies respective functional attributes of the PACF in the home network and of the PACF in the visited network and the interaction process between the two, and solves the problem of resource and admission control supporting roaming.

10 Claims, 6 Drawing Sheets

METHOD FOR RESOURCE AND ADMISSION CONTROL

FIELD OF THE INVENTION

The present invention relates to the field of communication, and more specifically, to a method for resource and admission control.

BACKGROUND OF THE INVENTION

At present, the Next Generation Network (NGN) is a hot research topic in the field of the current communication standards, it uses the Internet Protocol (IP) packet technology as its bearer network technology, integrates fixed communication and mobile communication, and can provide richer multimedia services, such as, emerging services with a real-time requirement (IP TV, video conference, multimedia remote teaching, video on demand, and the like). These services require a communication network to provide support for efficient end-to-end Quality of Service (QoS). Moreover, since users have increasing high requirements for the service quality of the network, providing the end-to-end QoS is one of the core problems of the NGN.

The International Telecommunication Union-Telecommunications standardization sector (ITU-T) is a telecommunication sector of the International Telecommunication Union (ITU), which has established standards related to the resource and admission control. In the latest draft of Resource and Admission Control Functions (RACF) published by the ITU-T, the functional structure of the RACF is provided. As shown in FIG. 1, the RACF is composed of two portions which are respectively a Policy Decision Functional Entity (PD-FE) and a Transport Resource Control Functional Entity (TRC-FE), wherein the TRC-FE interacts with a transmission function via an Rc, and interacts with a Transport Resource Enforcement Functional Entity (TRE-FE) via an Rn; and the PD-FE interacts with the TRC-FE via an Rt, interacts with a Customer Premises Network (CPN) via an Rh, interacts with a Policy Enforcement Functional Entity (PE-FE) via an Rw, interacts with Service Control Functions (SCF) of a service layer via an Rs, interacts with Network Attachment Control Functions (NACF) via an Ru, and the PD-FE interacts with other next generation networks via an Ri interface.

Besides, the PD-FE is relevant neither to transmission techniques nor to the SCF. The PD-FE makes a final decision for resource and admission control based on network policy rules, service information provided by the SCF, transport layer subscription information provided by the NACF, and resource availability decision result provided by the TRC-FE.

The TRC-FE is irrelevant to services but relevant to the transmission techniques. The TRC-FE is responsible for collecting and maintaining transmission network information and resource state information. Upon receiving a resource request from the PD-FE, the TRC-FE performs a resource-based admission control based on the QoS, the priority demand, the information of resource availability and the transmission-related policy rules.

A transport layer is composed of a Policy Enforcement Functional Entity (PE-FE) and a Transport Resource Enforcement Functional Entity (TRE-FE). The PE-FE executes the policy rules delivered by the PD-FE. The PE-FE is a packet-to-packet gateway and can be located between the Customer Premises Network (CPN) and an access network, between the access network and a core network, or between the networks of different operators, and is a key node which supports the traversing of a Network Address Translator (NAT), a port address translation control, and a dynamic QoS control. The TRE-FE executes the transmission resource policy rules delivered by the TRC-FE, of which the range and functions as well as the Rn interface need to be further researched and are not within the research scope of the R2 phase.

Currently, in order to settle the resource and admission control relating to inter-domain interaction and supporting roaming, relevant research institutes provide a configuration diagram of an RACF network as shown in FIG. 2. In FIG. 2, the SCF is located in an NGN visited network and interacts with the PD-FE of the NGN visited network; the PD-PE of the visited network interacts with the PD-FE of an NGN home network via the Ri interface; and the PD-FE interacts with the PE-FE and TRC-FE of the current network via the Rw and Rt interfaces, respectively. In the scene of FIG. 2, the NACF of the NGN visited network can only obtain user default access information rather than user QoS subscription information of the NACF of the home network.

With respect to the case above, a technical solution for resource and admission control relating to inter-domain interaction and supporting roaming has not been proposed in the prior art.

In the prior art, the SCF is generally located in the NGN home network and interacts with the PD-FE of the NGN home network, as shown in FIG. 3. FIG. 4 is a chart showing the resource requesting flow based on the case as shown in FIG. 3 in the related art, the flow includes the following steps:

401: a user initiates a service request and sends a request message to an SCF to trigger the SCF to generate a resource initialization request;

402: the SCF determines QoS requirement parameters (e.g. bandwidth, service type, etc.) of the requested service, and then sends, to a PD-FE of a home network (denoted by PD-FE (H)), a resource initialization request message (reservation) carrying a media stream description, QoS parameters, and the like, to request an RACF to perform authorization and reservation of QoS resource;

403: the PD-FE (H) performs an authorization check for the request, including verifying whether the requested QoS resource is consistent with the policy rules of local operators and with user subscription information from an NACF; if the authorization check is passed, the PD-FE (H) makes an initial policy decision for the service request according to the user subscription information, the policy rules of the local operators, and the service information;

404: since the PD-FE (H) does not have the requested transport layer resource, the resource initialization request message is further sent to the PD-FE (denoted by PD-FE (V)) of the visited network;

405: the PD-FE (V) performs an authorization check for the request, including verifying whether the requested QoS resource is consistent with the policy rules of local operators;

406: the PD-FE (V) decides (viz. selects) the access network and the core network related to the requested QoS resource, and then the PD-FE (V), based on the above decision result, sends the resource initialization request message (availability check) to the TRC-FE (denoted by TRC-FE (V)) of the corresponding visited network to check the resource availability of the related network;

407: the PD-FE (V) makes a finial admission decision based on the result of the authorization check in Step 405 and the result of the resource availability check in Step 406; if the requested QoS resource is rejected, the PD-FE (V) sends a resource initialization response message to the PD-FE (H), and the message carries the reasons for rejection;

408: the PD-FE (V) sends the resource initialization request message to the PE-FE (denoted by PE-FE (V)) of the visited network so as to install a final decision policy; and

409: the PE-FE (V) installs the final decision policy from the PD-FE (V) and sends a resource initialization response to the PD-FE (V);

wherein Steps 408 and 409 are optional steps;

410: the PD-FE (V) sends the resource initialization response to the PD-FE (H); and

411: the PD-FE (H) sends the resource initialization response to the SCF.

In the related techniques, there is the above technical solution of resource and admission control for the application scenario as shown in FIG. 3, however, the technical solution is not applicable to the application scenario as shown in FIG. 2, viz. a technical solution of resource and admission control relating to inter-domain interaction and supporting roaming has not been found in the prior art for the scene of FIG. 2.

SUMMARY OF THE INVENTION

The technical problem to be solved in the present invention is to provide a method for resource and admission control relating to inter-domain interaction and supporting roaming to overcome the shortcomings of the prior art.

In order to solve the above problem, the present invention provides a method for resource and admission control, and the method includes:

upon receiving a resource initialization request, which is used for requesting a Quality of Service, QoS, resource for a service, sent by a Service Control Functions, SCF, a Policy Decision Functional Entity, PD-FE, of a visited network performing an authorization check and a resource availability check for the resource initialization request, and sending the resource initialization request to a PD-FE of a home network;

the PD-FE of the home network performing an authorization check and making an initial policy decision for the resource initialization request, and sending a resource initialization response containing the generated initial policy decision to the PD-FE of the visited network; and the PD-FE of the visited network making a final admission decision for the resource initialization request according to the initial decision policy and the result of the resource availability check.

In addition, the PD-FE of the visited network performs the authorization check by verifying whether the QoS resource requested by the resource initialization request is consistent with policy rules of the visited network.

In addition, the PD-FE of the home network performs the authorization check by verifying whether the QoS resource requested by the resource initialization request is consistent with policy rules of the home network and user subscription information.

In addition, the PD-FE of the home network makes the initial policy decision for the resource initialization request according to the user subscription information, the policy rules of the home network, and service information.

In addition, after accomplishing the step of making the final admission decision, the method also comprises:

the PD-FE of the visited network sending the resource initialization request containing the decision policy generated by the admission decision to a Policy Enforcement Functional Entity, PE-FE, of the visited network; and upon receiving the resource initialization request sent by the PD-FE of the visited network, the PE-FE of the visited network installing the policy decision.

The present invention also provides a method for resource and admission control, and the method includes:

upon receiving a resource modification request, which is used for modifying a Quality of Service, QoS, resource for a service, sent by a Service Control Functions, SCF, a Policy Decision Functional Entity, PD-FE, of a visited network performing an authorization check and a resource availability check for the resource modification request, and sending the resource modification request to a PD-FE of a home network;

the PD-FE of the home network performing an authorization check and making an initial policy decision for the resource modification request, and sending a resource modification response containing the generated initial policy decision to the PD-FE of the visited network; and the PD-FE of the visited network making a final admission decision for the resource modification request according to the initial decision policy and the result of the resource availability check.

In addition, the PD-FE of the visited network performs the authorization check by verifying whether the QoS resource modified according to the resource modification request is consistent with policy rules of the visited network.

In addition, the PD-FE of the home network performs the authorization check by verifying whether the QoS resource modified according to the resource modification request is consistent with policy rules of the home network and user subscription information.

In addition, the PD-FE of the home network makes the initial policy decision for the resource modification request according to the user subscription information, the policy rules of the home network, and service information.

In addition, after accomplishing the step of making the final admission decision, the method also comprises:

the PD-FE of the visited network sending the resource modification request containing the decision policy generated by the admission decision to a Policy Enforcement Functional Entity, PE-FE, of the visited network; and upon receiving the resource modification request sent by the PD-FE of the visited network, the PE-FE of the visited network installing the policy decision.

The present invention also provides a method for resource and admission control, and the method includes:

upon receiving a resource releasing request, which is used for releasing a Quality of Service, QoS, resource of a service, sent by a Service Control Functions, SCF, a Policy Decision Functional Entity, PD-FE, of a visited network interacting with a Transport Resource Control Functional Entity, TRC-FE, of the visited network to release the QoS resource occupied in the TRC-FE of the visited network.

In addition, after the step of receiving the resource releasing request, the method also comprises:

the PD-FE of the visited network sending a resource releasing request to a Policy Decision Functional Entity, PD-FE, of the visited network to release a policy of the service installed in the PE-FE of the visited network.

In a word, the present invention provides a method for resource and admission control, which specifies respective functional attributes of the RACF in the home network and the RACF in the visited network and the interaction process therebetween, and solves the problem of resource and admission control relating to inter-domain interaction and supporting roaming.

DETAILED DESCRIPTION OF PREFERRED EMBODIMENTS

In order to settle the resource and admission control relating to inter-domain interaction and supporting roaming, the present invention provides a method for resource and admission control, which specifies respective functional attributes of the RACF in the home network and the RACF in the visited network and the interaction process therebetween.

The RACF of the visited network performs an admission control according to resource availability and the policy rules of local operators (may be referred to as policy rules of the visited network).

The RACF of the home network performs an admission control according to the service information from the visited network, the policy rules of local operators (may be referred to as policy rules of the home network), and the user subscription information from the NACF of the home network.

The PD-FE of the home network interacts with the PD-FE of the visited network via an Ri interface.

A detailed description will be given hereinafter in conjunction with the accompanying drawings and embodiments to a resource requesting process, a resource modification process, and a resource releasing process of the process of resource and admission control proposed by the present invention.

Figure 1:
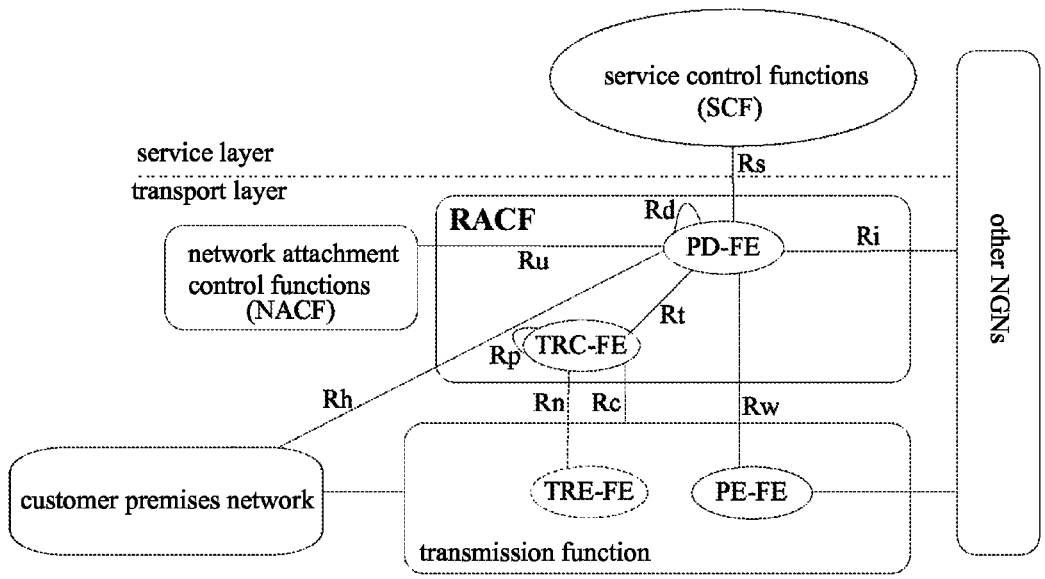
FIG. 1 is a schematic diagram showing a function frame of an RACF in the related art.
Figure 2:
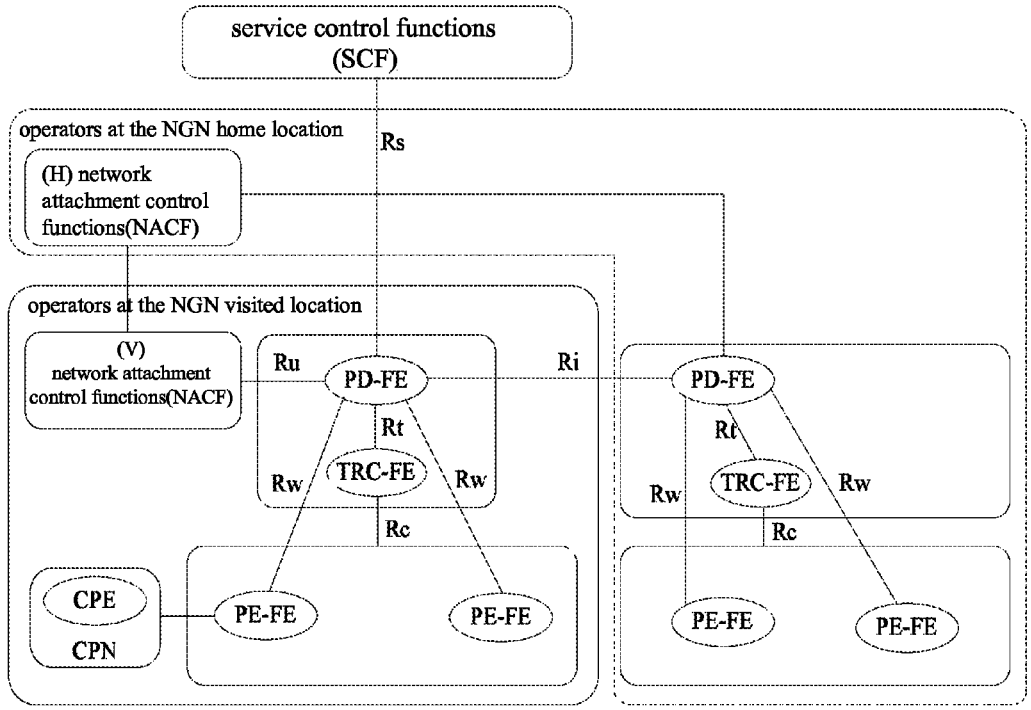
FIG. 2 is a schematic diagram showing an RACF network configuration when an SCF is located in an NGN visited network in the related art.
Figure 3:
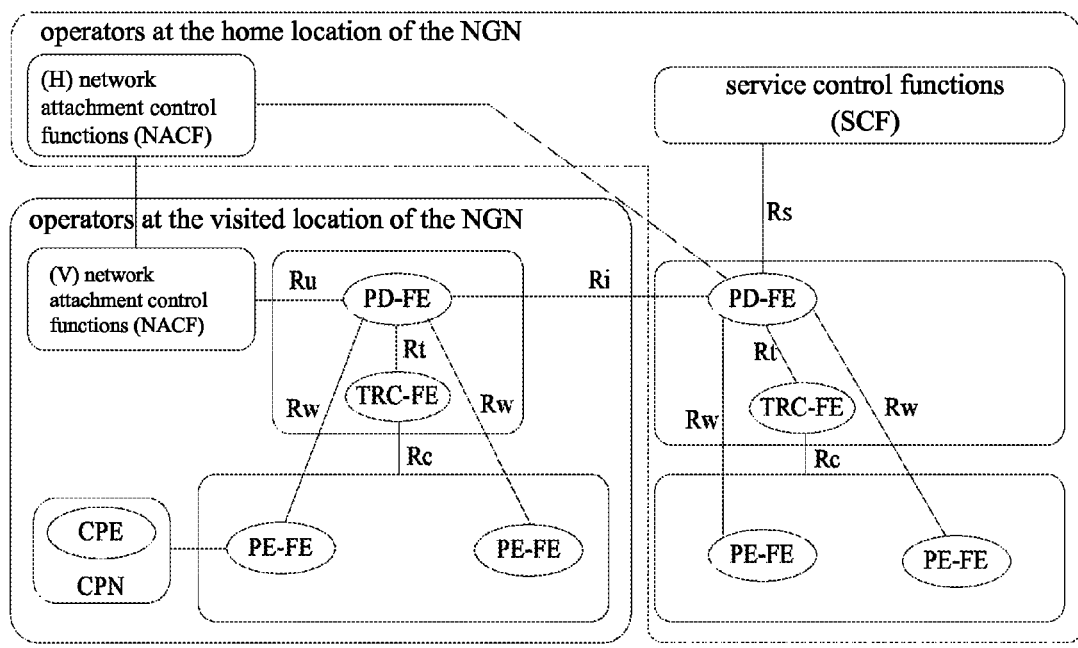
FIG. 3 is a schematic diagram showing an RACF network configuration when an SCF is located in an NGN home network in the related art.
Figure 4:
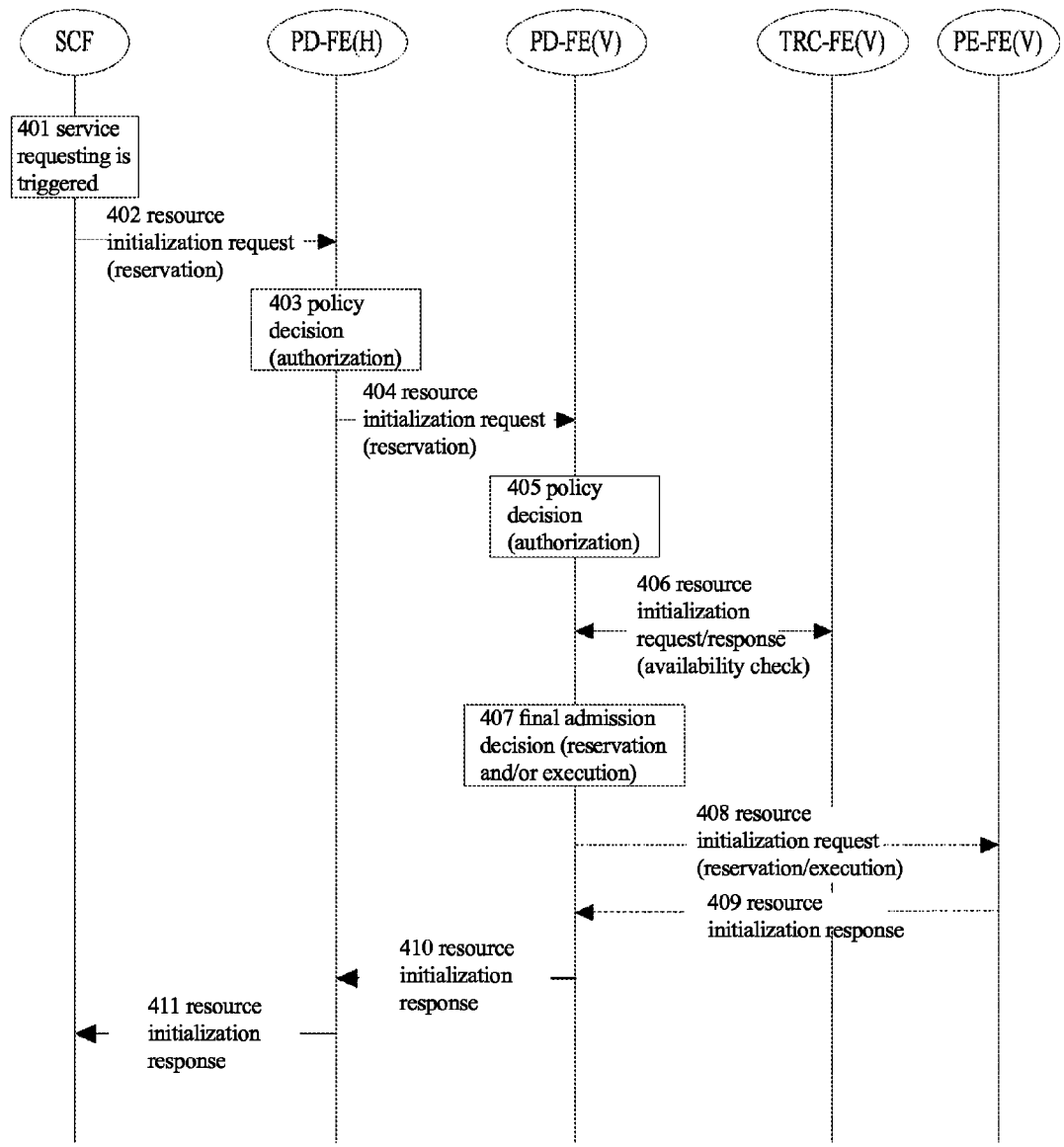
FIG. 4 is a chart showing the resource request flow based on a scene as shown in FIG. 3 in the related art.
Figure 5:
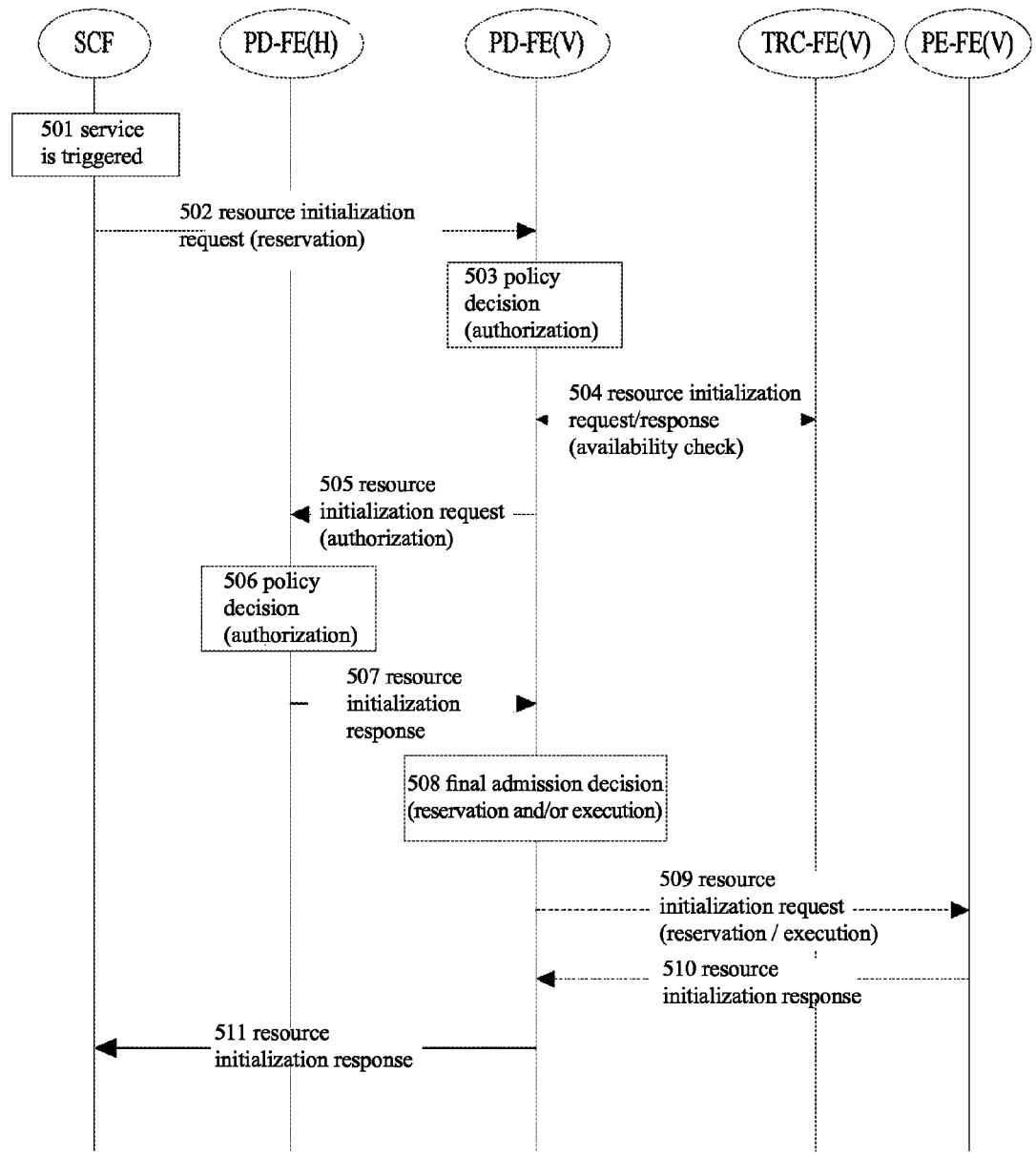
FIG. 5 is a flow chart showing a resource requesting process in a method for resource and admission control according to an embodiment of the present invention.

FIG. 5 is a flow chart showing a resource requesting process in a method for resource and admission control according to an embodiment of the present invention, the process including the following steps:

501: a user initiates a service request and sends a request message to an SCF to trigger the SCF to generate a resource initialization request;

502: the SCF determines QoS requirement parameters (e.g. bandwidth, service type, etc.) of the requested service, and then sends a resource initialization request message (reservation) to a PD-FE (V), the message carrying service information such as media stream description and QoS parameters, to request an RACF to perform authorization and reservation of QoS resource;

503: the PD-FE (V) performs an authorization check for the request, including verifying whether the requested QoS resource is consistent with the policy rules of local operators; if the authorization check is passed (viz. the requested QoS resource is consistent with the policy rules of local operators), the next step is executed, otherwise, the PD-FE (V) sends, to the SCF, a resource initialization response message to the SCF, and the message carries reasons for rejection;

504: the PD-FE (V) decides (viz. selects) the access network and the core network relating to the requested QoS resource, and then the PD-FE (v) sends the resource initialization request message (availability check) according to the above decision result to a corresponding TRC-FE (V) to check the resource availability of the related network;

505: since the PD-FE (V) does not have user subscription information, the resource initialization request message is further sent to a PD-FE (H);

506: the PD-FE (H) performs an authorization check for the request, including verifying whether the requested QoS resource is consistent with the policy rules of local operators and with the user subscription information from an NACF; if the authorization check is passed (viz. the requested QoS resource is consistent with the policy rules of local operators and with the user subscription information), the PD-FE (H), according to the user subscription information, the policy rules of local operators, service information, etc., makes an initial policy decision for the service request to generate an initial decision policy;

507: the PD-FE (H) sends a resource initialization response to the PD-FE (V), and the message contains the initial decision policy;

508: the PD-FE (V) makes a finial admission decision according to the result of the resource availability check of Step 504 and the result of the initial policy decision of Step 507 to generate a final decision policy;

509: if the final decision policy needs to be installed in the PE-FE (V), the PD-FE (V) sends the resource initialization request message to the PE-FE (V) to install the final decision policy; and

510, the PE-FE (V) installs the final decision policy from the PD-FE (V) and sends a resource initialization response to the PD-FE (V);

wherein Step 509 and Step 510 are optional steps; and

511: the PD-FE (V) sends the resource initialization response to the SCF;

wherein result information regarding whether to admit the QoS resource request is contained in the resource initialization response.

Figure 6:
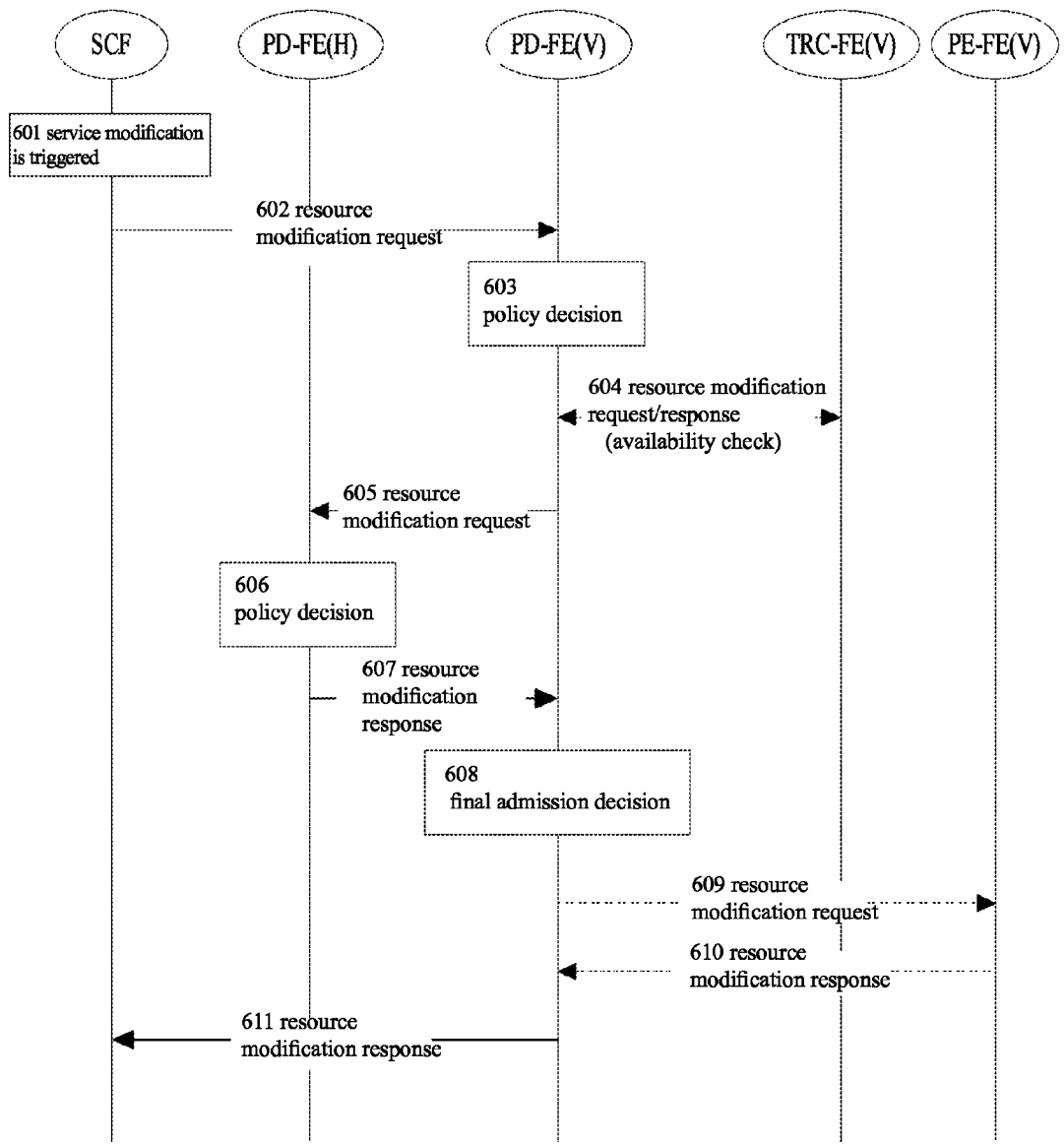
FIG. 6 is a flow chart showing a resource modification process in a method for resource and admission control according to an embodiment of the present invention.

FIG. 6 is a flow chart showing a resource modification process in a method for resource and admission control according to an embodiment of the present invention, the process including the following steps:

601: a user initiates a service modification request and sends a modification request message to an SCF to trigger the SCF to generate a resource modification request;

602: the SCF determines QoS requirement parameters (e.g. bandwidth, service type, etc.) of the service to be modified, and then sends a resource modification request message to a PD-FE (V), and the message carries service information to be modified such as QoS parameters and the like;

603: the PD-FE (V) performs an authorization check for the modification request, including verifying whether the modified QoS resource is consistent with the policy rules of local operators; if the authorization check is passed (viz. the modified QoS resource is consistent with the policy rules of local operators), the next step is executed, otherwise, the PD-FE (V) sends a resource modification response message to the SCF, and the message carries reasons for rejection;

604: the PD-FE (V) decides (viz. selects) the access network and the core network relating to the modified QoS resource, and then the PD-FE (v) sends the resource modification request message (availability check) according to the above decision result to a corresponding TRC-FE (V) to check the resource availability of the related network;

605: since the PD-FE (V) does not have user subscription information, the resource modification request message is further sent to a PD-FE (H);

606: the PD-FE (H) performs an authorization check for the resource modification request, including verifying whether the modified QoS resource is consistent with the policy rules of local operators and with the user subscription information from an NACF; if the authorization check is passed (viz. the modified QoS resource is consistent with the policy rules of local operators and with the user subscription information), the PD-FE (H), according to the user subscription information, the policy rules of local operators, service information, etc., makes an initial policy decision for the resource modification request to generate an initial decision policy;

607: the PD-FE (H) sends a resource modification response to the PD-FE (V), and the message contains the initial decision policy;

608: the PD-FE (V) makes a finial admission decision according to the result of the resource availability check of Step 604 and the result of the initial policy decision of Step 607 to generate a final decision policy;

609: if the final decision policy needs to be installed in the PE-FE (V), the PD-FE (V) sends the resource initialization request message to the PE-FE (V) to install the final decision policy; and

610, the PE-FE (V) installs the final decision policy from the PD-FE (V) and sends a resource modification response to the PD-FE (V);

wherein Step 609 and Step 610 are optional steps; and

611: the PD-FE (V) sends the resource modification response to the SCF;

wherein result information regarding whether to admit the QoS resource modification request is contained in the resource modification response.

Figure 7:
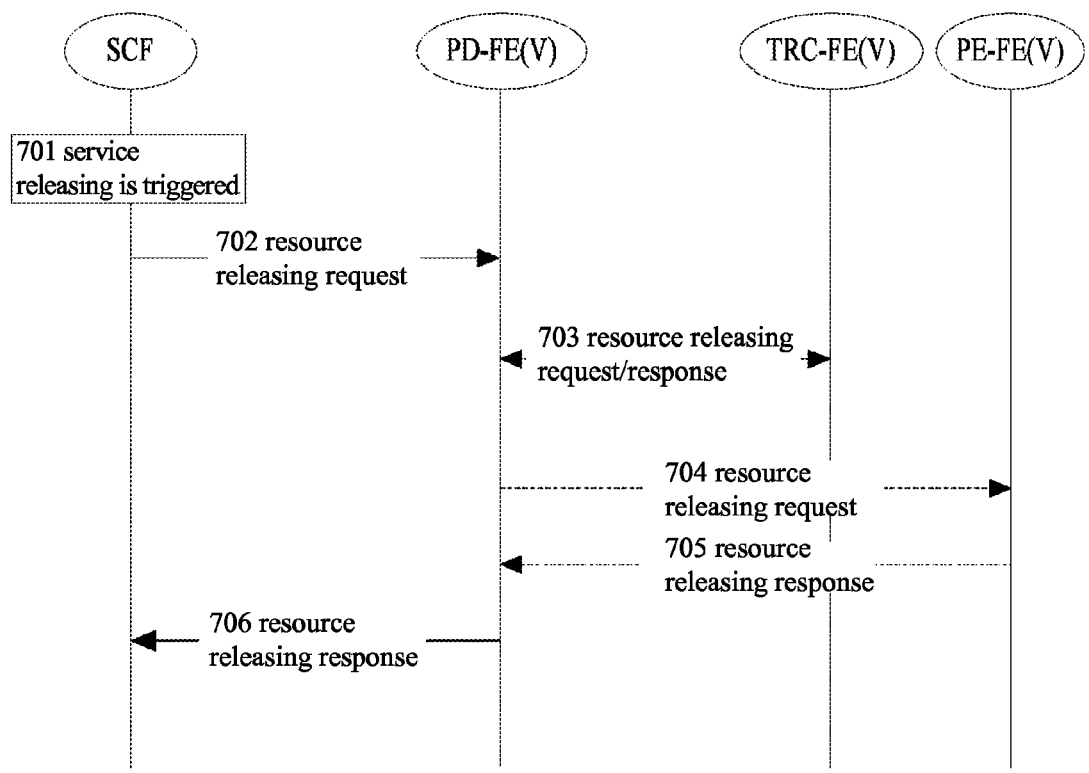
FIG. 7 is a flow chart showing a resource releasing process in a method for resource and admission control according to an embodiment of the present invention.

FIG. 7 is a flow chart showing a resource releasing process in a method for resource and admission control according to an embodiment of the present invention, and the process includes the following steps:

701: a user initiates a service releasing request and sends a releasing request message to an SCF to trigger an SCF to generate a resource releasing request;

702: the SCF sends a resource releasing request message to a PD-FE (V), the message carrying QoS resource information needing to be released;

703: the PD-FE (V) interacts with a TRC-FE (V) to release the corresponding QoS resource occupied in the TRC-FE (V);

the above interaction process specifically includes: the PD-FE (V) sends a source releasing request to the TRC-FE (V); the TRC-FE (V) returns a resource releasing response to the PD-FE (V);

704: if the policy of the service has been installed in the PE-FE (V) (viz. Step 509 and/or Step 609 have been executed), the PD-FE (V) sends the resource releasing request message to the PE-FE (V) to uninstall the policy thereof, and to release the QoS resource;

705: the PE-FE (V) releases the QoS resource and returns the resource releasing response to the PD-FE (V);

wherein Steps 704 and 705 are optional steps; and

706: the PD-FE (V) sends the resource releasing response to the SCF.

In a word, the technical solution of the present invention solves the problem of resource and admission control relating to inter-domain interaction and supporting roaming by specifying respective functional attributes of the RACF in the home network and the RACF in the visited network and the interaction process therebetween.

INDUSTRIAL PRACTICABILITY

The present invention provides a method for resource and admission control, which specifies respective functional attributes of the RACF in the home network and the RACF in the visited network and the interaction process therebetween, and solves the problem of resource and admission control relating to inter-domain interaction and supporting roaming

What is claimed is:

1. A method for resource and admission control, comprising:

upon receiving a resource initialization request, which is used for requesting a Quality of Service (QoS) resource for a service, sent by a Service Control Functions (SCF), a Policy Decision Functional Entity (PD-FE) of a visited network performing an authorization check and a resource availability check for the resource initialization request, and sending the resource initialization request to a PD-FE of a home network;

the PD-FE of the home network performing the authorization check and generating an initial policy decision for the resource initialization request, and sending a resource initialization response containing the generated initial policy decision to the PD-FE of the visited network;

the PD-FE of the visited network making generating a final admission decision for the resource initialization request according to the initial decision policy and the result of the resource availability check;

the PD-FE of the visited network sending the resource initialization request containing a final decision policy generated by the final admission decision to a Policy Enforcement Functional Entity (PE-FE) of the visited network; and upon receiving the resource initialization request sent by the PD-FE of the visited network, the PE-FE of the visited network installing the final decision policy.

2. The method according to claim 1, wherein the PD-FE of the visited network performs the authorization check by verifying whether the QoS resource requested by the resource initialization request is consistent with policy rules of the visited network.

3. The method according to claim 2, wherein the PD-FE of the home network performs the authorization check by verifying whether the QoS resource requested by the resource initialization request is consistent with policy rules of the home network and user subscription information.

4. The method according to claim 3, wherein the PD-FE of the home network generates the initial policy decision for the resource initialization request according to the user subscription information, the policy rules of the home network, and service information.

5. A method for resource and admission control as recited in claim 1, the method further comprises:

upon receiving a resource releasing request, which is used for releasing the QoS resource, sent by the SCF, the PD-FE of the visited network interacting with a Transport Resource Control Functional Entity (TRC-FE) of the visited network to release the QoS resource occupied in the TRC-FE of the visited network.

6. The method according to claim 5, wherein after the step of receiving the resource releasing request, the method also comprises:

the PD-FE of the visited network sending another resource releasing request to the Policy Enforcement Functional Entity (PE-FE) of the visited network to release a policy of the service installed in the PE-FE of the visited network.

7. A method for resource and admission control, comprising:
- upon receiving a resource modification request, which is used for modifying a Quality of Service (QoS) resource for a service, sent by a Service Control Functions (SCF), a Policy Decision Functional Entity (PD-FE) of a visited network performing an authorization check and a resource availability check for the resource modification request, and sending the resource modification request to a PD-FE of a home network;
- the PD-FE of the home network performing the authorization check and generating an initial policy decision for the resource modification request, and sending a resource modification response containing the generated initial policy decision to the PD-FE of the visited network;
- the PD-FE of the visited network generating a final admission decision for the resource modification request according to the initial decision policy and the result of the resource availability check;
- the PD-FE of the visited network sending the resource modification request containing a final decision policy generated by the final admission decision to a Policy Enforcement Functional Entity (PE-FE) of the visited network; and
- upon receiving the resource modification request sent by the PD-FE of the visited network, the PE-FE of the visited network installing the final decision policy.

8. The method according to claim 7, wherein the PD-FE of the visited network performs the authorization check by verifying whether the QoS resource modified according to the resource modification request is consistent with policy rules of the visited network.

9. The method according to claim 8, wherein the PD-FE of the home network performs the authorization check by verifying whether the QoS resource modified according to the resource modification request is consistent with policy rules of the home network and user subscription information.

10. The method according to claim 9, wherein the PD-FE of the home network generates the initial policy decision for the resource modification request according to the user subscription information, the policy rules of the home network, and service information.

* * * * *